July 24, 1928. 1,678,591
W. H. FULWEILER
QUANTITATIVE DETERMINATION OF NAPHTHALENE IN ILLUMINATING GAS
Original Filed Jan. 12, 1922   2 Sheets-Sheet 1

WITNESS:
Rob R Kitchel

INVENTOR
Walter H. Fulweiler
BY
Augustus B Stoughton
ATTORNEY.

July 24, 1928.

W. H. FULWEILER 1,678,591

QUANTITATIVE DETERMINATION OF NAPHTHALENE IN ILLUMINATING GAS

Original Filed Jan. 12, 1922   2 Sheets-Sheet 2

WITNESS:
Rob R Litchel

INVENTOR
Walter H. Fulweiler
BY
Augustus B. Stoughton
ATTORNEY.

Patented July 24, 1928.

1,678,591

UNITED STATES PATENT OFFICE.

WALTER H. FULWEILER, OF WALLINGFORD, PENNSYLVANIA, ASSIGNOR TO THE U. G. I. CONTRACTING COMPANY, OF PHILADELPHIA, PENNSYLVANIA, A CORPORATION OF DELAWARE.

QUANTITATIVE DETERMINATION OF NAPHTHALENE IN ILLUMINATING GAS.

Original application filed January 12, 1922, Serial No. 528,861. Divided and this application filed June 29, 1922. Serial No. 571,717.

This application is a division of my application, Serial No. 528,861, filed January 12th, 1922, which has matured into Patent 1,443,330, issued Jan. 23, 1923.

The principal objects of the present application are to provide for the rapid and accurate quantitative determination of naphthalene in illuminating gas even by unskilled persons, to provide a simple, expeditious and reliable method for that purpose, and to provide portable, compact, and comparatively inexpensive apparatus by means of which the method can be practiced.

In the practice of the invention the naphthalene content of the gas is converted into naphthalene picrate by passing a known quantity of gas through a standard solution of picric acid thereby increasing the electric resistance of the solution, and the value of the electric resistances of the treated and of the standard solutions are compared thereby estimating quantitatively the naphthalene content of the gas.

The invention comprises the improvements to be presently described and finally claimed and the description will be made in connection with the accompanying drawings forming part hereof and in which—

Figure 1:
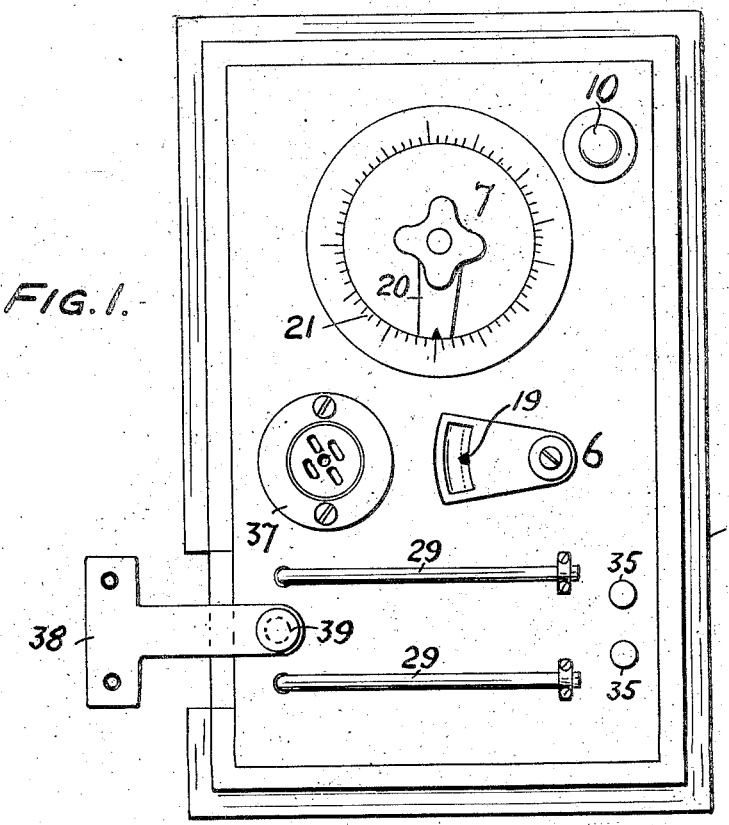
Figure 1 is a top or plan view of conductivity bridge apparatus with the cover removed and parts omitted and which embodies features of the invention.
Figure 2:
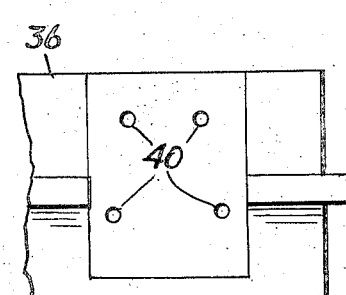
Fig. 2 is an elevational view of the right-hand end part of the apparatus shown at the bottom of Figure 1 with parts omitted.
Figure 3:
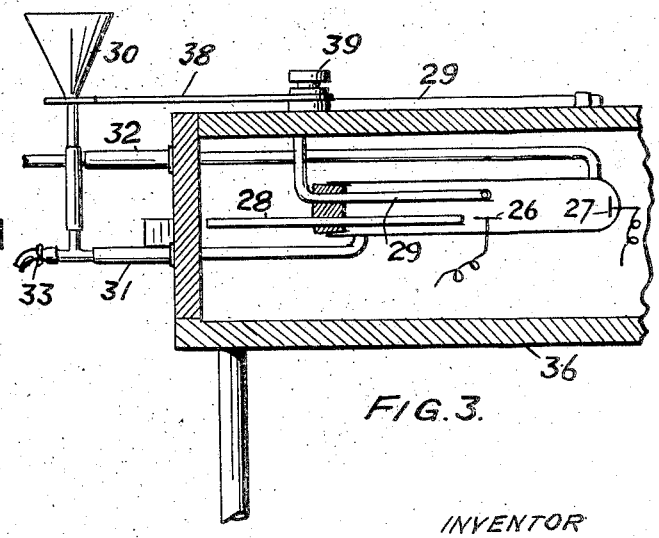
Fig. 3 is a transverse sectional view taken through the lower portion of Figure 1.
Figure 4:
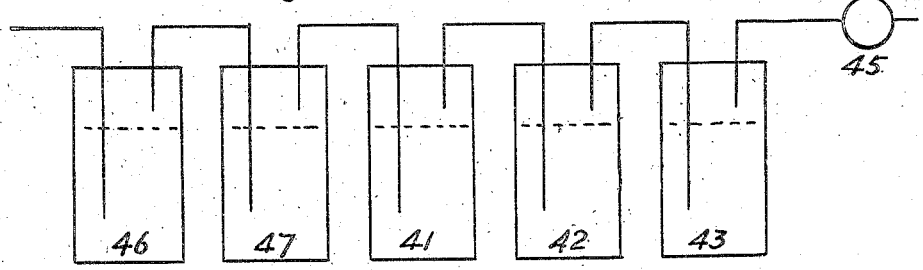
Fig. 4 is a view diagrammatically showing a train of gas washing bottles and also indicating a meter.
Figure 5:
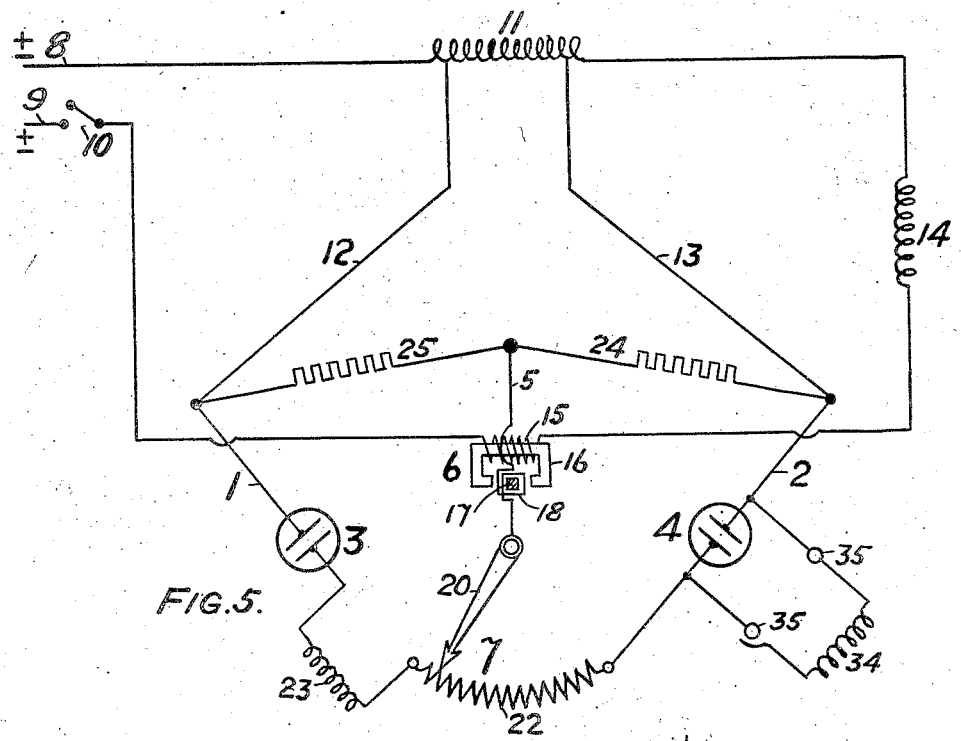
Fig. 5 is a diagrammatic view illustrating the circuit connections of the apparatus shown in Figure 1.

In the drawings, more particularly Fig. 5, there is shown an electric balance having two of its arms, 1 and 2, provided with conductivity cells 3 and 4 and having its bridge 5 provided with a balance indicator indicated generally at 6, and with a balance adjuster generally indicated at 7. 8 and 9 are the leads of an alternating current circuit provided with a switch 10 for making and breaking it. 11 is a step-down transformer shown as an auto transformer interposed in the alternating current circuit and across which the electric balance is connected as by conductors 12 and 13. 14 is an inductive resistance in series with the step-down transformer 11 and with the field winding 15 and serving to limit the current passing through the apparatus. The field winding 15 appertains to the balance indicator 6 which is shown as an alternating current galvanometer having fixed poles 16 and a fixed core 17 and a movable coil 18 which carries the pointer 19, Fig. 1. The balance adjuster 7 is shown as a key 20 co-operating with a scale 21, Fig. 1, and adapted to be connected with points of different potential in the coil 22, and the coil 22 and the coil 23 are of equal resistance when the adjuster is in zero position. The arms 24 and 25 are of equal resistance. The conductivity cells have the same constants and are alike so that a description of one will suffice. 26 and 27 are the electrodes and they are sealed through the wall of the cell and each cell is provided with a rod 28 arranged between one of its ends and the electrode 26, and by pushing the rod 28 in and pulling it out the constant of the cell can be adjusted. The constant of cell signifies the characteristics for the purpose intended of the cell itself without regard to the particular fluid employed in it. The volumetric capacity of the cell is a factor in changing the constant. 29 is a thermometer for showing the temperature of the contents of the cell. The funnel 30 and tube 31 constitute an inlet for the cell, and the tube 32 constitutes an overflow for the cell, thus the liquid is introduced from the bottom of the cell in excess and air bubbles are avoided. 33 is a pinch connection by which the cell can be emptied. 34 is a known resistance that may be connected by binding posts 35 across the conductivity cell 4 for a purpose to be presently described. The described parts are assembled in a cabinet 36 in such a way that some of them are exposed as shown in Figures 1 and 3 when the lid of the cabinet is open or removed, and others of the parts are concealed within the cabinet. 37 is a socket for the reception of a line plug. The bracket 38 may be turned about the pivot 39 and it serves to support the funnels 30. The apertures 40 serve for the reception of the connections 31 and 32. The washing bottles 41, 42 and 43 of the train of washing bottles shown in Fig. 4 and which includes a meter, indicated at 45, are filled with a standard solution of picric acid. The washing bottles 46 and 47 contain reagents and when present they serve to remove certain ingredients other than naphthalene from the gas.

In making a test gas is passed through the train of washing bottles at an appropriate rate, for example, a rate not exceeding .8 cubic feet per hour until a distinct precipitate appears in bottle 41. The flow of gas is then stopped and the appropriate meter readings made. The train is then disconnected and the contents of bottles 46 and 47 discarded. Bottles 41, 42 and 43 are then brought to approximately 25° C., for example, from 27 to 23° C., and are allowed to remain at that temperature for a few moments and then they are vigorously shaken. Bottle 41 contains the insoluble naphthalene picrate and the bottle 42 is a catch bottle for insoluble picrate. The bottle 43 contains standard picric acid solution as it may have been modified by the passage of gas through it. The electrical resistances of the standard solution and of the contents of the bottle 41, and perhaps the bottle 42, are not the same, the standard solution being of greater conductivity. Filter papers are put into the funnels 30 and the contents of bottle 41 is filtered into, for example, the righthand conductivity cell 4 and the contents of bottle 43 is filtered into the lefthand conductivity cell 3. In both cases the additions are continued until the solution begins to overflow from the upper tubes 32. The temperature of the thermometers 29 is then read and the solutions are brought, for example, by warming one or the other of them with the hand, to approximately the same temperature, for example, within .1° C. of each other. The absolute temperature is not so important as the relative temperature. The circuit is then completed, for example, by pressing the push button 10, and the balance adjuster 7 is turned until the balance indicator 6 stands at zero. The push button can then be released and the reading of the dial 21 and of the thermometers 29 observed. The result of this is that the value of the electric resistances of the standard and of the other solution are compared and the relative difference noted on the dial 21. The scale reading at 21 is noted along the horizontal line of the chart shown in Fig. 6 and is carried up to the calibrated temperature lines on the chart as indicated, for example, at $a$, and at the intersection of the line $a$ with the observed temperature line $b$, and at the left as indicated by the line $c$, will be found as at $e$ the grains of naphthalene per hundred cubic feet of gas when one cubic foot has been used as a sample. In most cases it is unnecessary to measure the resistance of the contents of bottle 42. However, some naphthalene may have reached bottle 42 and in such case a small amount of the solution in bottle 42 is filtered in and used to wash out the cell 4, and the cell is then filled with the solution from bottle 42 and the difference in resistance determined as before. In case both bottles 41 and 42 are read on the dial 21 the curve is entered with the sum of the dial readings.

Figures 6, 7:
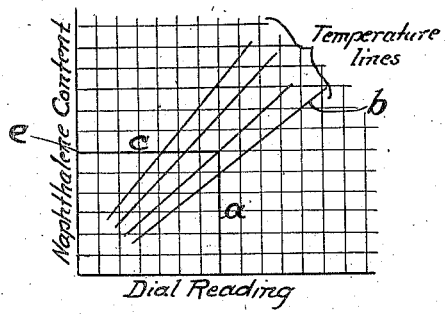
Fig. 6 is a chart for showing the naphthalene concentration from readings taken by the apparatus of Figure 1.
Fig. 7 is a view of a chart for another use in connection with readings taken from the apparatus shown in Figure 1.

The standard picric acid solution may well be approximately a saturated solution at 25° C. Such a solution is made up and poured into the cell 3 which can be well washed out with it. The fixed resistance 34 is then connected to the binding post 35 and a reading made on the dial 21. The calibrated curve for the standard picric acid solution shown in Fig. 7 is then referred to by applying the temperature reading at the left as indicated at $x$, and if the reading of $y$ at the bottom of the chart does not agree with the reading on the scale 21, the proportions are changed until these readings agree.

In the description and claims reference is made to naphthalene, but the invention is applicable to the determination of ammonia and hydrogen sulphide by using appropriate solutions, for example, for ammonia use can be made of sulphuric acid, and for hydrogen sulphide use can be made of a neutral solution of cadmium chloride.

The method herein described is claimed in my application, Serial No. 528,861, and therefore is not claimed herein.

It will be obvious to those skilled in the art to which the invention relates that modifications may be made not only in procedure but also in construction and arrangement without departing from the spirit of the invention which is not limited as to those matters or otherwise than as the prior art and the appended claims may require.

I claim:

1. Apparatus for the quantitative determination of constituents in illuminating gas comprising the combination of an electric balance having two of its arms provided with conductivity cells and having its bridge provided with a balance indicator and with a balance adjuster including a scale, inlet tubes having funnels and communicating with the lower parts of the cells respectively, outlet tubes communicating with the upper parts of the cells, rods adjustable endwise in respect to both of the electrodes with which each cell is provided, thermometers for the cells, means for connecting alternating current to the balance, said means including a switch and a cabinet in which the parts are assembled to constitute a portable structure, substantially as described.

2. In apparatus of the class described the combination of a pair of conductivity cells provided with fixed electrodes and means accessible from the exterior of the cells and adapted to vary the capacity of the cells, whereby the constants of the cells can be adjusted to equality.

WALTER H. FULWEILER.